3,046,101
WAX COMPOSITION FOR CANDLES
John D. Tench, Prospect Park, Pa., assignor to Sun Oil Company, Philadelphia, Pa., a corporation of New Jersey
No Drawing. Filed Jan. 20, 1959, Ser. No. 787,822
4 Claims. (Cl. 44—7.5)

This invention relates to paraffin wax candles. More particularly, the invention is directed to a novel composition of petroleum paraffin wax which is particularly suitable for use as the wax ingredient of candle compositions. The novel composition of the invention is composed of three separate petroleum paraffin waxes, each of which has distinct physical properties and is employed in certain limited proportions. The invention is further directed to a process for preparing the above novel composition, and to candles made therefrom.

In the manufacture of candles, it is generally agreed that the finished candle should possess certain characteristics. One such characteristic, which is of major importance, is the burning quality of the finished candle. While the nature and construction of the wick, and its size in relation to the diameter of the candle, affect the burning quality of a candle, the melting point of the composition from which the candle is formed is also of considerable significance. When a candle is burned, the heat from the flame melts the candle composition, and the molten fuel which is formed flows by wick action up to the flame where it is consumed by burning. It is apparent that the temperature, and rate, of melting of the candle composition must be suitable to provide adequate fuel to maintain a proper flame. The melting point must not be so low as to produce molten fuel in excess of that which can be accommodated by the wick, thus causing "dripping." On the other hand, if the melting point of the candle composition is too high, an insufficient amount of molten fuel will be available and the flame will be extinguished. In view of these considerations, a suitable melting point for petroleum paraffin waxes, when employed in candle compositions is generally considered to be in the range of from about 125° F. to about 135° F.

Another highly desirable characteristic of finished candles is the resistance of the candle to deformation (or "bending," as it is commonly called) at moderately elevated temperatures and under the influence of small bending forces such as its own weight. In this respect, petroleum paraffin waxes generally suffer from an inherent disadvantage in that the temperature at which they begin to soften is considerably below that at which they actually melt. This property of petroleum paraffin waxes renders candles made therefrom particularly susceptible to bending. While the difficulty can be overcome to an extent by employing higher melting point waxes of comparatively greater hardness, adjustment in this direction is limited by the considerations respecting maximum melting point mentioned above. Another partial solution to this problem is obtained by incorporating from 3 percent to about 30 percent by volume of stearic acid with the petroleum paraffin wax in formulating candle compositions. The stearic acid not only aids in stiffening the finished candles without requiring the use of waxes of excessively high melting point, but also adds desirable opacity to the finished candles. While the latter alternative is in common use today, as stated above it represents no more than a partial answer to the problem. It is significant to note, particularly with respect to the instant invention, that in current candle-making practice it is still considered essential to exclude all but very small amounts of relatively soft petroleum paraffin waxes from candle compositions in order to achieve a desirable resistance to bending in the finished candles, even though stearic acid be employed in such compositions. This requirement is highly undesirable in that it unduly limits the manufacturing methods by which such candle compositions can be formed into finished candles.

Two principal methods for manufacturing candles are in common use today. These are commonly termed the "hand-dipping" method and the "machine-molding" method. The former method comprises repeatedly dipping a large number of pre-cut wick lengths, suspended in regular spacing from a frame, into a container of molten candle composition until the desired accumulation has been achieved. The candles are then hardened by cooling in air or in water. While certain of the operating conditions, such as the temperature of the molten candle composition and the rate of cooling of the formed candles, are somewhat critical and must be carefully controlled, in general this method permits relatively great flexibility, particularly as to the composition of the candle material which can be manufactured by the method. Thus, it is possible to select the candle composition to achieve the optimum in candle characteristics. For example, candles having superior resistance to bending can be formed by this method from candle compositions containing only very low proportions of relatively soft paraffin wax. Significantly, such candle compositions are formed almost exclusively by the "hand-dipping" method and cannot be formed successfully by machine molding. In the latter method, candles are formed by pouring molten candle composition into a plurality of cylindrical metal molds which contain prepositioned wick lengths, and which are mounted vertically in a large tank of circulating water. The water is used to cool the molds, and thus to harden the soft candles after forming. Generally, during cooling, the temperature of the water is maintained at a temperature in the range of from about 40° F. to about 70° F. Each of the molds is equipped with a powered internal ram which can be moved axially so as to eject the candle when formed. With this method, in contra-distinction to the hand-dipping method, it is necessary that the petroleum paraffin wax candle compositions employed contain relatively high proportions of soft wax, so that the formed candles can be hardened within the molds without cracking. The soft wax is also necessary to facilitate removal of the candles from the molds by means of the rams. Unfortunately, the presence of this soft wax causes the finished candles to have an undesirably poor resistance to bending. Thus, while machine molding is somewhat more efficient and economical than hand dipping, it is generally considered unsuitable for the manufacture of high bending resistance candles from petroleum paraffin waxes.

In view of the above, a principal object of this invention is to provide a novel petroleum paraffin wax composition which, although containing a major proportion of a realtively soft wax, is suitable for the manufacture of candles having a superior resistance to bending. A further object is to provide a process for preparing the above novel wax composition. Still another object is to provide candles of superior resistance to bending which can be manufactured by either the hand-dipping or machine-molding methods. These and other objects and advantages will become more readily apparent from a reading of the following detailed description of the invention.

It has now been discovered that by blending three distinct petroleum paraffin waxes, one of which is a relatively soft wax and present in the greatest proportion, the resulting composition is unexpectedly suitable for use as the wax ingredient of candle compositions for making candles having a superior resistance to bending. Furthermore, it has been found that candle compositions comprising the novel three-component wax composition of this invention can be successfully formed into finished candles by either the machine-molding or hand-dipping methods. It is essential to the practice of the invention, that the three paraffin wax components have definite properties within specified narrow ranges and be employed in certain limited proportions, as will hereinafter appear.

As used herein, melting points for paraffin waxes are as determined by ASTM method designated D87-57, penetrations are as determined by ASTM method designated D1321-57T and viscosities (SUS equals Saybolt Universal seconds) are as determined by ASTM method designated D446-53, unless otherwise stated.

The first paraffin wax component used in the present compositions must have a melting point of from 125° F. to 132° F., a penetration at 100° F. of from 80 to 120, and a viscosity at 210° F. of from 38 to 40. This particular paraffin wax is relatively very soft, as is readily apparent from its penetration value, and for this reason is generally considered unsuitable as a principal component of candle compositions for making candles of high bend resistance. The paraffin wax component meeting the above specifications can be prepared by two methods. In the first method of preparation, a slack wax such as is obtained from the dewaxing of lubricating oil, and which may still contain approximately 30 percent oil, is vacuum distilled, and the fraction distilling between about 390° F. to about 565° F. at 2 mm. of mercury absolute pressure is collected. This fraction is dissolved in a solvent which is preferably a mixture of methyl ethyl ketone and benzene in about equal volumes, solution being effected at a temperature of from about 165° to about 195° F., and with about 6 parts by volume of the solvent per part of the wax fraction being used. The solution is slowly cooled to a temperature of from about 75° F. to about 83° F., and the wax which precipitates at this temperature is separated by means such as filtration. The solution separated from the precipitated wax is further slowly cooled to a temperature of from about 25° F. to about 33° F., and the wax which precipitates at this lower temperature, after separation by means such as filtration, forms the first paraffin wax component of the present composition. Advantageously, the wax after separation from the solution is washed, preferably with additional solvent and about the same temperature as filtration, e.g., from 28° F. to 32° F. and the wax is then again separated and recovered.

An alternate method for preparing the first paraffin wax component of the present invention provides considerable flexibility in obtaining a wax product of the desired properties. This method comprises separating from slack wax two distillate fractions, one of which distills in the range of from about 390° F. to about 475° F. at 2 mm. of mercury absolute pressure, and a second fraction distilling in the range of from about 450° F. to about 565° F. at 2 mm. of mercury absolute pressure. As usually occurs, the initial boiling point of the second fraction will overlap, to some extent, the end boiling point of the first-mentioned distillate fraction. The lower boiling distillate fraction is dissolved in a suitable solvent at an elevated temperature, as above described, with about 6 parts by volume of the solvent per part of the wax fraction being used, and the solution is slowly cooled to a temperature of from about 25° F. to about 32° F. The wax which precipitates at this temperature is then separated by means such as filtration. The higher boiling distillate fraction is also dissolved in a suitable solvent at an elevated temperature, as above described, about 4.5 parts by volume of solvent per part of the wax fraction being used, and the solution is slowly cooled to a temperature of from about 72° F. to about 82° F. The wax which precipitates at this temperature is separated by means such as filtration, and is not further used in the practice of this invention. The remaining solution is further slowly cooled to a temperature of from 25° F. to about 33° F. The wax precipitated at this latter temperature is then separated by means such as filtration. The two distillate waxes prepared as above described are combined to form the first paraffin wax component of the present invention. Considerable flexibility is obtained since the blending may be in various proportions so that the properties of the resulting combination are within the limits set forth above for the first paraffin wax component. If desired, the two distillate wax fractions can be washed independently, preferably with an additional quantity of the solvent and at the temperature of the final precipitation, and separated from the solvent prior to blending; or, the wet distillate fractions may be first combined, washed jointly, and then separated. In general, from about 69 to about 75 percent of the first paraffin wax component will consist of wax from the lower boiling distillate fraction since, as has been found, such proportions give a wax having properties within those specified as essential for the first paraffin wax component of the invention.

The second paraffin wax component used in the present compositions must have a melting point of from 130° F. to 136° F., a penetration at 100° F. of from 30 to 50 and a viscosity at 210° F. off rom 36 to 39 SUS. On vacuum distillation, 5 percent of the wax should be distilled at a temperature equivalent to about 750° F. at atmospheric pressure, and 95 percent should be distilled at a temperature equivalent to about 820° F. at atmospheric pressure. This wax is prepared from petroleum by distilling slack wax from the dewaxing of lubricating oil, or a topped, high wax-content crude petroleum, and collecting the fraction distilling between about 390° F. and 475° F. at 2 mm. of mercury absolute pressure. This distillate fraction is dissolved in a solvent such as an equivolume mixture of methyl ethyl ketone and benzene at an elevated temperature. Preferably, about four parts by volume of solvent per part of the wax fraction is employed. The resulting solution is then cooled to from about 32° F. to about 37° F., and the wax which precipitates at this temperature is separated from the liquid by means such as filtration. Advantageously, the wax is washed, at the temperature of precipitation, with an additional quantity of the same solvent. Upon removal of the wash solvent, the recovered paraffin wax forms the second paraffin wax component of the present composition.

The third paraffin wax component employed in the practice of this invention must have a melting point of from 149° F. to 155° F., a penetration at 130° F. of from 35 to 65 and a viscosity at 210° F. of from 42 to 46 SUS. On vacuum distillation, 5 percent of this wax should be distilled at a temperature equivalent to about 850° F. at atmospheric pressure, and 95 percent should be distilled at a temperature equivalent to about 950° F. at atmospheric pressure. This wax is prepared from petroleum by distilling a slack wax, which may be from the dewaxing of lubricating oil or from a topped, high wax-content crude petroleum, and collecting the fraction distilled between about 450° F. and 565° F. at 2 mm. of mercury absolute pressure. This distillate fraction is dissolved in a solvent such as an equivolume mixture of methyl ethyl ketone and benzene at an elevated temperature. Preferably, about two parts by volume of solvent per part of wax fraction is employed. The resulting solution is then cooled to a temperature of from about 77° F. to about 83° F., and the wax which precipitates at this temperature is separated by means such as filtration. Advantageously, the wax is washed, preferably with an additional quantity of the solvent and at the temperature of precipitation, and then separated from the solvent. The recovered wax forms the third paraffin wax component of the invention.

As above stated, it is essential that the above-described paraffin wax components of the novel composition of this invention be present in specific amounts. The first paraffin wax component must constitute from 45 to 55 percent by weight; the second paraffin wax component must constitute from 32 to 42 percent by weight; and the third paraffin wax component must constitute from 10 to 16 percent by weight, all percentages being based on the final composition. If the proportions of the two relatively low-melting paraffin wax components (viz., the first and second components) are below the stated ranges and, consequently, the proportion of the relatively high-melting component (viz., the third component) is above the stated maximum, the melting point of the resulting blend will be too high and candles comprising the blend will exhibit a poor burning quality, specifically an undesirably small and inadequately fed flame. Where the opposite is the case, i.e., the proportions of the relatively low-melting components are above, and the relatively high-melting component is below, the stated ranges, excessive dripping of the finished candles will result. Furthermore, and more significantly, concentrations of the relatively very soft low-melting component (viz., the first component) outside of the stated permissible range results in completely defeating the purpose of the invention. Thus, concentrations above the stated maximum result in the finished candles having poor resistance to bending, while concentrations below the stated minimum produce candle compositions which cannot be satisfactorily formed by the machine-molding method.

It should be clearly understood that this invention also contemplates the use of stearic acid, in amounts which are customary and desirable, together with the novel petroleum paraffin wax composition of the invention. Generally, in formulating candle compositions, stearic acid is added to the wax ingredient, or base candle composition, in amounts ranging from about 3 percent to about 30 percent by volume. It is to be further understood that other commonly-employed candle composition additives, such as dyes and the like, can be used where necessary or desirable.

In addition to requiring that critical proportions of each component must be present in the novel composition of the invention as above described, it appears that waxes having properties outside of the stated ranges for each paraffin wax component cannot be used satisfactorily. Thus, substitution for any or all of the components, of waxes having properties above or below the critical ranges given for the three specified properties of each wax component, completely defeats the purposes of the invention in that the resulting composition exhibits one or more of the above-described difficulties. The novel three-component petroleum paraffin wax composition of the invention will have a melting point of from about 129° F. to about 134° F., a penetration at 100° F. of from about 55 to about 85, a viscosity at 210° F. of from about 38.0 to about 39.5 SUS, and will normally contain less than about 0.50 percent by weight of residual oil.

In order to demonstrate a specific embodiment of the present invention, and the advantages thereof, the three petroleum paraffin wax components of the novel and improved compositions were separately prepared as follows:

The first paraffin wax component is prepared from slack wax obtained by dewaxing lubricating oil. The slack wax contains about 30 percent residual oil. This slack wax is distilled at a pressure of 2 mm. mercury absolute and two distillate fractions are collected, one boiling in the range of from about 390° F. to about 475° F., and the other boiling in the range of from about 450° F. to 565° F., at 2 mm. of mercury absolute pressure. The lower boiling fraction is dissolved in an equivolume mixture of methyl ethyl ketone and benzene at a temperature of about 170° F., 6 parts by volume of solvent being used per part of the wax fraction. The resulting solution is slowly cooled to a temperature of 28° F., and the precipitated wax is recovered by filtration. After washing with additional solvent at 28° F., the wax is again recovered by filtration. The higher boiling distillate fraction is dissolved in a similar solvent, with 4.5 parts by volume of the solvent per part of the wax fraction used, and the resulting solution is cooled to 80° F. The precipitated wax is separated by filtration and discarded, and the filtrate is further cooled to 30° F. The wax separating at this latter temperature is separated by filtration, washed with an additional quantity of solvent at 30° F., and then separated from the solvent by filtration. The two so-formed waxes are blended in quantities such that the final composition contains 72 percent of wax derived from the lower-boiling distillate fraction and 28 percent derived from the higher-boiling distillate fraction. This blend constitutes the first paraffin wax component of the invention. This component has a melting point of 127° F., a viscosity at 210° F. of 39.0 SUS and a penetration of 100° F. of about 100.

The second paraffin wax component has a melting point of 134° F., a penetration at 100° F. of about 40 and a viscosity at 210° F. of 38.1 SUS and is prepared as described below. On vacuum distillation, 5 percent of this wax is distilled at a temperature equivalent to about 750° F. at atmospheric pressure, and 95 percent is distilled at a temperature equivalent to about 820° F. at atmospheric pressure. Specifically, this wax is prepared by topping a high wax-content crude petroleum to about 38 percent bottoms. The bottoms are charged to a vacuum distillation operation which operates at 2 mm. of mercury absolute pressure, and the fraction distilling between 390° F. and 475° F. is collected. This distillate fraction is dissolved in a solvent consisting of a mixture of about 60 volume percent methyl ethyl ketone and 40 volume percent benzene at a temperature of about 180° F., about 4 parts by volume of the solvent per part of wax being used. The resulting solution is slowly cooled to a temperature of about 35° F., and the wax precipitated at this temperature is separated by filtration. The wax cake is further washed with an additional quantity of the above solvent at a temperature of 35° F., and the wax is then recovered from the solvent.

The third paraffin wax component of the invention, having a melting point of 151° F., a viscosity of 210° F. of 43.6 SUS and a penetration at 130° F. of about 50 is prepared as described below. On vacuum distillation, 5 percent of this wax distills below a temperature equivalent to 820° F. at atmospheric pressure, and 95 percent distills below a temperature equivalent to 950° F. at atmospheric pressure. Specifically, this wax is prepared by topping a high wax-content crude petroleum to about 38 percent bottoms. The bottoms are charged to a vacuum distillation operation, which operates at 2 mm. of mercury absolute pressure, and the fraction distilling between about 450° F. and about 565° F. is collected. This distillate fraction is dissolved in a solvent consisting of a mixture of 60 volume percent methyl ethyl ketone and 40 volume percent benzene at a temperature of about 180° F., about 2 parts by volume of solvent per part of wax being used. The resulting solution is slowly cooled to a temperature of 80° F., and the wax precipitated at this temperature is separated by filtration. The wax cake is then washed with an additional quantity of the same solvent at a temperature of 80° F., and the wax is recovered from the solvent by filtration. The recovered wax constitutes the third paraffin wax component of the invention.

The three paraffin wax components are blended together by heating a mixture thereof to a temperature of about 200° F., with stirring. The quantities of the individual components employed are such that the resulting composition contains 50 percent of the first paraffin wax component, 37 percent of the second paraffin wax component and 13 percent of the third paraffin wax component, all percentages being expressed on a weight basis. The final composition has a melting point of 131.6° F., a penetration at 100° F. of about 79, a viscosity at 210° F. of 38.8 SUS and a residual oil content of 0.3 percent by weight.

The above-prepared wax composition is employed as the sole wax constituent of the improved candle compositions tested in the following experiments.

EXPERIMENT A

This experiment illustrates the suitability of improved candle compositions comprising the novel petroleum paraffin wax composition of this invention for manufacturing candles by the machine-molding method.

Stearic acid is incorporated in the above-prepared petroleum paraffin wax composition in an amount equivalent to 20% by volume of the resulting candle composition. Candles are then manufactured from the candle composition by the conventional machine-molding technique. The temperature of the molten candle composition is about 175° F. at pouring, and the molds are preheated to a temperature of 120° F. After pouring, the formed candles are allowed to harden in the molds for a period of approximately 25 minutes during which time the temperature of the circultating cooling water is maintained at 65° F. No difficulty is experienced in ejecting the finished candles from the molds. In fact, their mold release characteristics are excellent. Furthermore, there is no internal cracking within the candles, and their appearance is, in general, excellent.

EXPERIMENT B

This experiment is performed to illustrate the unexpectedly superior resistance to bending of machine molded candles comprising the improved petroleum paraffin wax composition of this invention, as compared with candles similarly manufactured from competitive petroleum paraffin wax compositions available commercially for the same purpose.

Candle compositions are prepared from the improved wax composition, and from two competitive wax compositions, by incorporating stearic acid in each of two portions of each wax in amounts equivalent to 15% and 20% by volume, respectively, of the resulting candle compositions. The six candle compositions so prepared are manufactured into candles by the machine molding technique described in Experiment A.

The resistance to bending of the above candles is then determined by a standard test. In the test, the candle is mounted, being supported at its base at an angle of 5° from the vertical, and subjected to progressively higher constant temperatures, for a period of 24 hours at each temperature, until the deflection, or bending, of the candle exceeds an additional 5°. The temperature at which the deflection of the candle exceeds the 5° maximum deflection criterion is the lowest temperature at which the candle fails the test. Results are presented in the following table, together with the physical properties of the petroleum paraffin waxes employed.

Table

| Base Candle Composition (Petroleum paraffin wax—without stearic acid) | Melting Point, ° F. | Penetration at 100° F. | Lowest Temperature of Bending Test Failure, -° F. | |
|---|---|---|---|---|
| | | | With 15 Vol. percent stearic acid | With 20 Vol. percent stearic acid |
| Improved | 131.6 | 79 | 93 | 94 |
| Competitive A | 133.0 | 51 | 89 | 92 |
| Competitive B | 133.1 | 69 | 88 | 90 |

Competitive wax A does not contain a significant amount of soft wax, as is clearly indicated by its comparatively very low penetration value. Competitive wax B does contain some soft wax, as evidenced by its relatively higher penetration value, and the effect of this soft wax is to decrease resistance to bending, as expected. Contrary to expectation, however, the improved wax which contains a very soft wax in the greatest proportion, exhibits a resistance to bending in candles made therefrom substantially superior to either of the competitive waxes.

In preparing the three components of the paraffin wax compositions of this invention, the operating conditions specified herein must be carefully observed in order to secure the advantages of the invention. However, in one respect, some variation may be practiced and good results still obtained. Specifically, the solvent employed for dissolution of the wax fractions can be varied both as to the nature of its components and their respective proportions. Thus the solvent described, consisting of approximately equal parts by volume of methyl ethyl ketone and benzene, gives good results, but more or less of these two constituents, e.g. from about 30 to about 70 percent by volume of benzene, can also be used. Furthermore, other solvents can replace either methyl ethyl ketone or benzene. For example, toluene can be substituted for a portion of the benzene and good results obtained.

This invention is to be distinguished from that disclosed in my copending United States patent application Serial Number 787,827 of even filing date, wherein I have disclosed a novel petroleum paraffin wax composition consisting of the same three wax components but in substantially different proportions, as being especially suitable for coating fibrous containers for packaging cottage cheese. In that application, I disclose a composition consisting of from 25 percent to 35 percent by weight of the wax component herein termed the first paraffin wax component; from 50 percent to 60 percent by weight of the component herein termed the second paraffin wax component; and from 12 percent to 18 percent by weight of the component herein termed the third paraffin wax component. The latter composition is not suitable for use as the wax constituent of candle compositions in accordance with the instant invention, nor is the composition herein disclosed suitable for coating fibrous cottage cheese containers as contemplated by my copending application.

The invention claimed is:

1. A wax composition suitable for use in candles consisting essentially of: (A) from 45 percent to 55 percent by weight of a paraffin wax having a melting point of from 125° F. to 132° F., a penetration at 100° F. of from about 80 to about 120 and a viscosity at 210° F. of from 38 to 40 SUS; and (B) from 32 percent to 42 percent by weight of a paraffin wax having a melting point of from 130° F. to 136° F., a penetration at 100° F. of from about 30 to about 50 and a viscosity at 210° F. of from 36 to 39 SUS; and (C) from 10 percent to 16 percent by weight of a paraffin wax having a melting point of from 149° F. to 155° F., a penetration at 130° F. of from about 35 to about 65 and a viscosity at 210° F. of from 42 to 46 SUS.

2. A wax composition according to claim 1 wherein the paraffin wax of (A) constitutes about 50 percent by weight; the paraffin wax of (B) constitutes about 37 percent by weight; and the paraffin wax of (C) constitutes about 13 percent by weight.

3. A candle composition consisting essentially of from about 3 percent to about 30 percent by volume of stearic acid and from about 70 percent to about 97 percent by volume of a wax composition consisting essentially of: (A) from 45 percent to 55 percent by weight of a paraffin wax having a melting point of from 125° F. to 132° F., a penetration at 100° F. of from about 80 to about 120 and a viscosity at 210° F. of from 38 to 40 SUS; and (B) from 32 percent to 42 percent by weight of a paraffin wax having a melting point of from 130° F. to 136° F., a penetration at 100° F. of from about 30 to about 50 and a viscosity at 210° F. of from 36 to 39 SUS; and (C) from 10 percent to 16 percent by weight of a paraffin wax having a melting point of from 149° F. to 155° F., a penetration at 130° F. of from about 35 to about 65 and a viscosity at 210° F. of from 42 to 46 SUS.

4. A candle consisting essentially of a combustible wick positioned in the candle composition of claim 3.

References Cited in the file of this patent

UNITED STATES PATENTS

| | | |
|---|---|---|
| 2,638,411 | Thompson et al. | May 12, 1953 |
| 2,670,318 | Halamka et al. | Feb. 23, 1954 |
| 2,761,814 | Post | Sept. 4, 1956 |
| 2,825,635 | Dooley et al. | Mar. 4, 1958 |